C. E. MASON.
SHIFTER SHOE FOR CLUTCHES.
APPLICATION FILED JULY 15, 1918.
1,345,327.
Patented June 29, 1920.
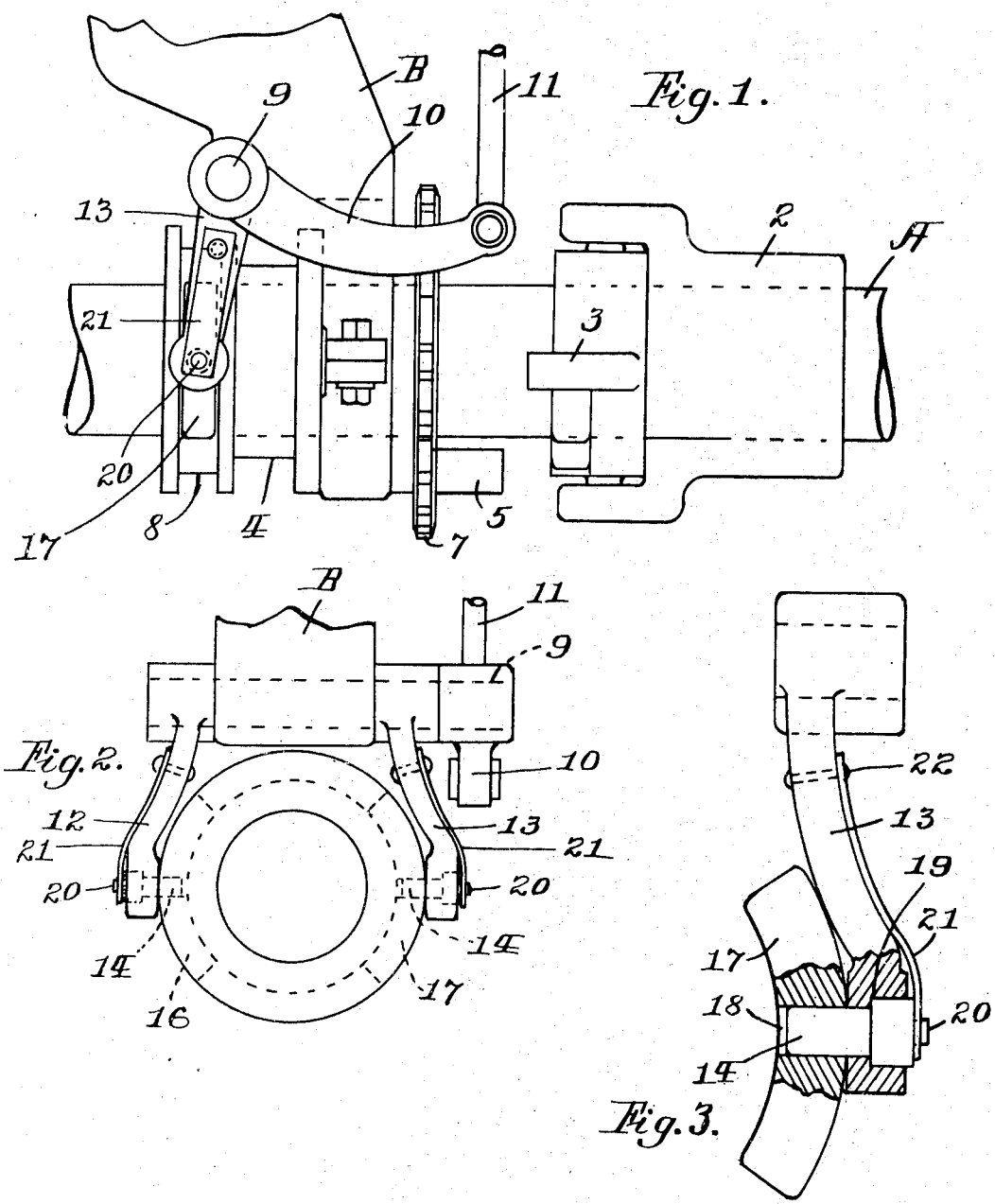
Inventor:
Charles E. Mason,
by: [signature]
Attorney.

UNITED STATES PATENT OFFICE.

CHARLES E. MASON, OF DETROIT, MICHIGAN, ASSIGNOR TO GRANT WALDREF, OF ST. PAUL, MINNESOTA.

SHIFTER-SHOE FOR CLUTCHES.

1,345,327.

Specification of Letters Patent. Patented June 29, 1920.

Application filed July 15, 1918. Serial No. 245,078.

*To all whom it may concern:*

Be it known that I, CHARLES E. MASON, a citizen of the United States, residing at Detroit, in the county of Wayne and State of Michigan, have invented a new and useful Improvement in Shifter-Shoes for Clutches, of which the following is a specification.

The object of this invention is to provide an improved shifter shoe for clutches by means of which the shoe is caused to wear evenly and can be more easily replaced when desired. Formerly it has been the practice to hold the shifter shoe on clutches, which shift the sleeves of the clutches by the use of cap screws passing through the ends of shift levers and it has been found that these screws frequently become loose and back out, thus causing the shoes to either drop out of position or wear unevenly. These objections are entirely overcome by my improvement. More particularly the improvements are applicable to clutches used for transmitting power from the main drive shafts on automobile trucks to driven elements such as hydraulic hoists, but the invention can also be used for other purposes.

To these ends my invention comprises the features of construction and combination of parts hereinafter described and claimed.

In the accompanying drawing forming part of this specification, Figure 1 is a side elevation of a clutch showing my improvement applied thereto; Fig. 2 is an end view of the construction illustrated in Fig. 1, and Fig. 3 is a side elevation of one of the shoe elements, part of the structure being broken away and in section for the purpose of more clearly illustrating the construction of the parts.

In the drawing let A indicate a drive shaft upon which is mounted the driving member 2 of a clutch, which may be of any suitable construction. The clutch member 2 illustrated is provided with a clutch jaw 3. Arranged to coöperate with the driving clutch member 2 on the shaft A is the driven clutch member 4, which is in the form of a sleeve journaled on said shaft and adapted to slide longitudinally thereon. Said sleeve carries the jaw 5, which is adapted to be moved into and out of engagement with the dog 3 for the purpose of transmitting motion to a sprocket wheel 7 carried by the driven clutch member on the sleeve 4. The sleeve 4 is formed with a shifter ring 8 and is adapted to slide through a stationary supporting member B of any suitable construction in which is journaled a rocker shaft 9, said shaft being adapted to be turned by a crank arm 10 and an operating thrust rod 11. Mounted upon the rocker shaft 9 are two shifter arms 12 and 13, which spread downwardly, their lower ends being pivotally secured by the pins 14 to a pair of shifter shoes 16 and 17, which engage in the shifter ring 8. Each of the shoes 16 and 17 is formed with an opening 18, in which an end of the pin 14 engages the shoe. The opposite end of the pin is formed with a shoulder 19 seated in the lower end of one of the arms 12 or 13 to limit the distance the pin projects into the shoe. The end of the pin 14 seated in the arm 13 projects from the shifter arm and has a small nib 20 over which a leaf spring 21 removably engages, said leaf spring being pivotally secured at its upper end to the shifter arm by a rivet or other suitable fastener 22. By lifting the spring 21 with its lower end out of engagement with the nib 20 and swinging the spring on the fastener 22 with its lower end away from over said nib, the pin can easily and quickly be lifted out and removed from the shoe, thus allowing the shoe to be easily removed from the collar 8 and replaced without having to dismantle a considerable portion of the apparatus as heretofore. The pins 14 are preferably hardened and ground to produce a close fit and reduce wear. In operation when the operating rod 11 is moved up and down, the driven clutch member is thrown into and out of engagement with the driving clutch member by sliding the sleeve 4 on the shaft A, the shifter shoes performing their function in the usual manner. In the event the shifter shoes wear they can easily and quickly be replaced by lifting the pins 14 out of the shifter arms and the worn shifter shoes replaced by new ones, the change being made by one unfamiliar with mechanics.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:

1. In combination with a drive shaft having driving and driven clutch members thereon, one of said clutch members being movable into and out of engagement with the other, a shifter shoe adapted to movably engage said movable clutch member to move the latter into clutch engaging and disengaging positions, a shifter arm movably mounted to actuate said shifter shoe, a pin slidingly inserted into said shifter arm and shoe whereby it may be readily lifted out of engagement with said parts and a spring on said arm arranged to hold said pin inserted in said parts and movable into a position permitting said pin to be withdrawn.

2. In combination with a drive shaft having driving and driven clutch members thereon, one of said clutch members being movable into and out of engagement with the other, a shifter shoe adapted to movably engage said movable clutch member to move the latter into clutch engaging and disengaging positions, a shifter arm movably mounted to actuate said shifter shoe, a pin slidingly inserted into said shifter arm and shoe whereby it may be readily lifted out of engagement with said parts and formed with a nib on its outer end, and a spring pivotally mounted on said arm, arranged to engage over said nib and hold said pin inserted in said shoe and arm and movable to be lifted off of said nib and swung clear of said pin, whereby said pin may be withdrawn from engagement with said shoe and arm.

In testimony whereof, I have signed my name to this specification.

CHARLES E. MASON.